Aug. 20, 1957 — F. A. S. WOOD — 2,803,427

SLIDE VALVE

Filed Sept. 8, 1953 — 2 Sheets-Sheet 1

INVENTOR:
FRANK A.S. WOOD,
BY Kingsland, Rogers & Ezell
ATTORNEYS

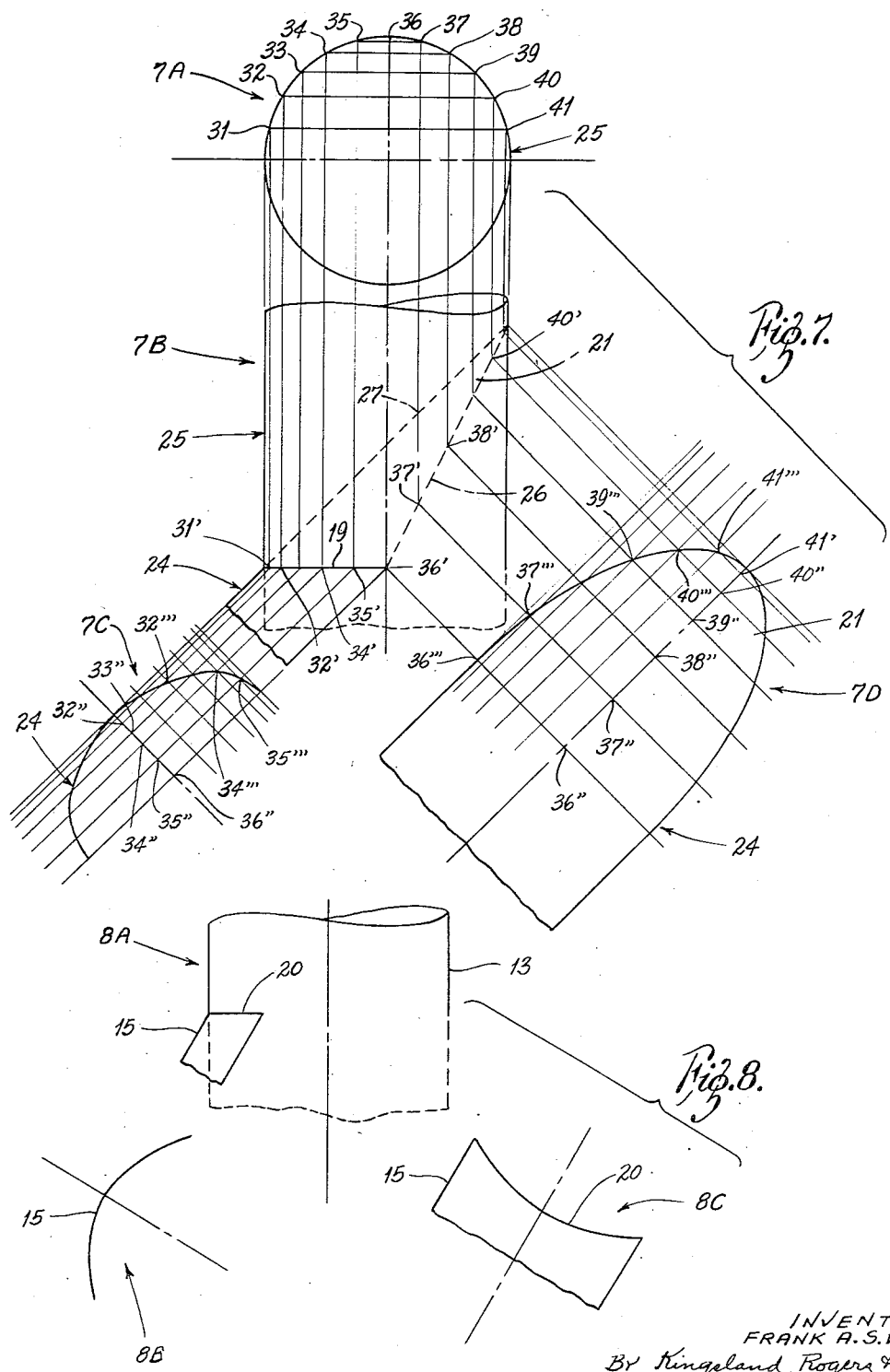

United States Patent Office 2,803,427
Patented Aug. 20, 1957

2,803,427

SLIDE VALVE

Frank A. S. Wood, St. Louis, Mo.

Application September 8, 1953, Serial No. 378,929

8 Claims. (Cl. 251—326)

This invention relates to improvements in slide valves and, in particular, is concerned with a slide valve which is mounted on a collar adapted to join together two pipes or conduits. The slide valve is so mounted on the supporting collar such that it enters and controls flow of fluid within the pipe at an angle to the axis of the pipe to keep the turbulent flow therein at a minimum.

The slide valve of this invention is so arranged as to present a minimum length when inserted in pipes or conduits and to present as little disturbance as possible to flow therein. This is made possible by the particular design of the slide plate or gate which is a plate of curved cross section which fits within a slot extending in a straight direction in the slide valve. When speaking of the straight slot throughout this specification, it should be understood that the exterior surface edges of the slot are formed so that they fall in parallel planes positioned at right angles to the axis. This slot has its outside edges arranged perpendicularly to the axis of the pipes within which the valve is interfitted so that the valve housing need only be as long as the width of the slot, which is very short, and the supporting structure of the collar of the valve. The slide plate is further designed so that it presents 100% free opening within the valve and at the same time completely fills and seals the slot in the open position to prevent any dust from the outside atmosphere from entering the pipe or, conversely, from allowing any leakage of the fluid from the pipe to the atmosphere. By this means a completely sealed valve is made possible.

In the past, flat slide valves have been used which enter the pipe or valve in a circular slot at right angles to the pipe. These have been objected to because of the turbulence created within the pipe when the slide valve is closed in a right angle direction to the axis of the pipe. Also, flat slide valves have been used in which flat slide plates are inserted within the pipe at an angle thereto or at the bias, but these also create an undesirable turbulence within the pipe when in the partially closed position. Also, in this latter style the slot within which the slide plate fits is curved and requires a good deal of axial length within the pipe so that a compact and short valve is not obtainable.

Accordingly, it is an object of this invention to provide a slide valve having a slide plate which controls fluid flow without the creation of undue turbulence therein.

It is a further object of this invention to provide a slide valve having a curved slide plate which can be withdrawn to an open position presenting 100% free opening and wherein the interior of the valve is closed off from the atmosphere at all times.

It is still another object of this invention to provide a slide valve having a supporting collar provided with a slot for the introduction of a slide valve plate therethrough, and for adjustment of the slide plate within a conduit at an angle through the axis thereof to provide a minimum of turbulence in fluid flow when the valve is in a partially closed position.

Yet another object of this invention is to provide for the insertion of a slide plate in a slide valve within a conduit in such a manner that the plate enters the conduit and valve through a slot which has its exterior edges disposed at right angles to the axis of the conduit to make possible an extremely short valve along the axial direction of the conduit.

Yet a further object of this invention is to provide for the introduction of a slide plate in a slide valve at an angle to the conduit within which the valve is situated such that the slide plate can be reversed so as to provide for substantially full closing or full opening therein, as desired.

Another object of this invention is to provide a slide valve which can be designed to accommodate a slide plate for introduction into a conduit at an angle from just above 0° to 90° and with the assurance that the slot through which it enters is arranged at right angles to the axis of the conduit so as to keep the valve as short as possible.

A further object of this invention is to provide a slide valve having a curved slide plate introduced at an angle to the axis of the conduit within which the valve is situated, and in which the valve is made from easily accessible materials such that it is readily adjustable and can be simply constructed without the requirement of any rigorous maintenance.

Other objects and purposes of this invention will appear from the specification and description of the invention which follows and will be further evident to those skilled in the art.

In the accompanying drawings, the valve of this invention is illustrated for the purpose of description, but it is to be realized that modifications may be made thereof and that these drawings are for the purpose of example only.

In these drawings:

Fig. 7 shows the development of the slide plate for the fully closed valve; and

Fig. 8 is a drawing showing the configuration of the 100% free opening valve.

Figure 1:
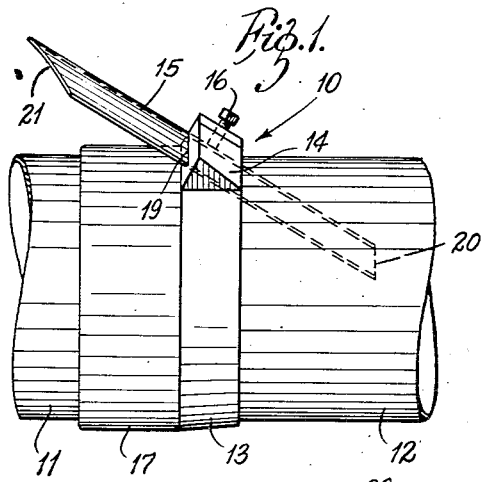
Fig. 1 is a view in side elevation of the valve attached to two conduits.
Figure 2:
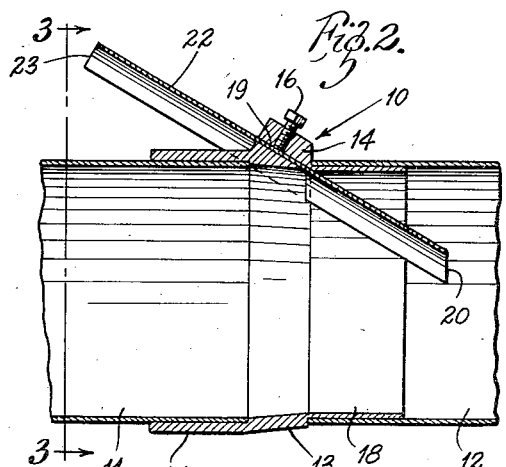
Fig. 2 is a vertical cross-sectional view taken on the axis of the valve.

Referring now to the drawings, and Fig. 1 in particular, the valve is shown generally indicated at 10 connected to conduits 11 and 12. The valve comprises a main collar or support 13 adapted to receive the two conduits, a valve housing 14 mounted on the collar, and a slide plate 15 which is movable within the housing by means of a setscrew 16.

The collar may be made of a casting or otherwise suitably formed of metal, plastic material, etc., and includes an enlarged rim-like end 17 which is adapted to receive the conduit 11 therein. The other end 18 is of a reduced diameter and receives the conduit 12 on the exterior thereof. The central portion of the collar is somewhat thickened to provide for rigidity and stability for connection of the two conduits on either side. The connection of the conduits 11 and 12 to the ends 17 and 18 may be by a press fit as shown in the drawings or, if desired, these members may be threaded, welded, or the like.

The housing 14 is provided on the thickened central portion of the collar and has a slot 19 which travels at its exterior edges at right angles to the axis of the circular collar. The structure of the housing is best shown in Figs. 2, 3, 4 and 5 wherein it is to be observed that the slot provides a guideway for the slide plate and is at an angle to the axis of the collar of approximately 30°, as shown in these drawings. This angle may be varied in other designs as will be discussed in relation to Figs. 7 and 8, as appears hereinafter.

The main feature to be observed is that the surface edges of this slot have a more or less rim-like characteristic and travel perpendicularly around the periphery of the collar at right angles to the axis such that a straight sided slot is obtained which limits the axial length of the valve to a desirably short distance. The housing 14 is further provided with a setscrew 16, as previously mentioned, which is adapted to be tightened against the slide plate 15 when fitting therein so that adjustment may be had merely by loosening and tightening the setscrew.

As shown in Figs. 1 to 5, inclusive, the valve is of a 100% free opening type, which means that it is adapted to receive a slide plate which can be fully extracted so as to be fully received within the slot 19 and close it off in sealing relationship and still allow 100% free opening of the valve for full and unrestricted flow of fluid therethrough. Further, in this valve, shown in Figs. 1 to 5, the valve housing 14 extends only about one-third of the way around the periphery of the collar. It is, however, to be understood that this may vary all the way up to one-half the peripheral distance around the valve. In this embodiment when the slide valve is completely inserted to its full length within the valve housing and conduit beyond the intermediate position shown in Figs. 1 and 2, the percentage of restriction will be approximately four-fifths.

Where complete closure is desired a slide plate of the type described in connection with Fig. 7, as appears hereinafter, is utilized and the valve housing is extended to one-half the circumference of the collar to accommodate the slot 19 which must be one-half the circumferential distance of the periphery of the collar.

The slide plate 15 shown in Fig. 1 is designed so that it can be reversed within the slot 19 of the valve housing. This slide plate includes at its lower right end, as shown in Fig. 1, a generally crescent or elliptical shaped configuration, as indicated at 20. This configuration conforms to the line of entry or the line of strike where the slide plate enters the slot 19. Thus, it can be seen that where the slide plate 15 is withdrawn from the position shown in Fig. 1 so as to be drawn up against slot 19, there will be no restriction of the slide plate within the interior of the valve or the conduit and free flow is established. At the same time the slide plate completely fills the slot so that there can be no leakage therethrough.

Figure 3:
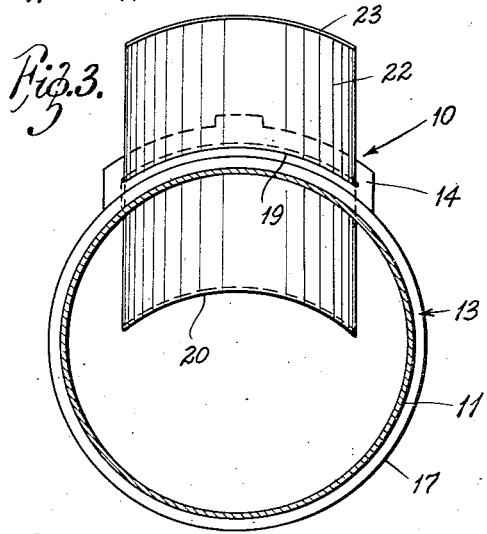
Fig. 3 is a vertical cross-sectional view taken on the line 3—3 of Fig. 2.
Figure 4:
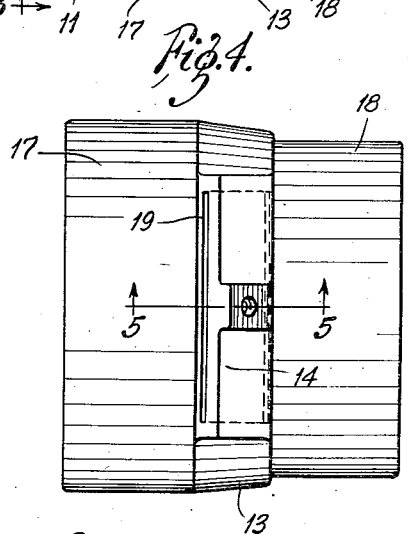
Fig. 4 is a top plan view of the valve with the slide plate removed therefrom.
Figure 5:
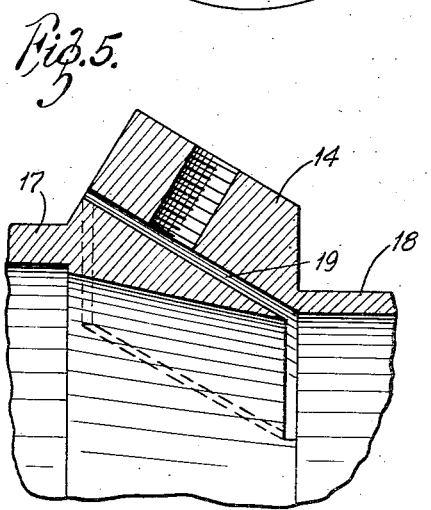
Fig. 5 is a fragmentary cross-sectional view taken on the line 5—5 of Fig. 4.
Figure 6:
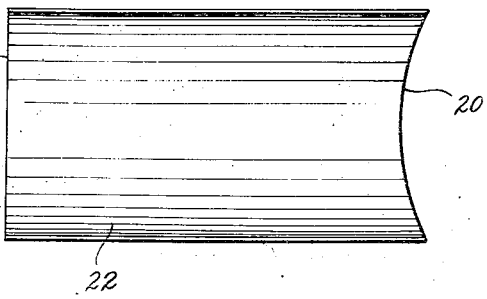
Fig. 6 is a top plan view of the slide plate which is adapted to provide for 100% free opening of the valve upon full opening thereof.

The other end 21 of the slide plate 15 has the configuration shown in Fig. 7 to be described. This end of the slide plate when fully inserted within the valve closes completely against the interior wall of the conduit 12 and, as will appear from Fig. 3, will seal off about 90% of the interior of the conduit. This is the reverse of the type of slide plate utilizing the end 20 which, as shown in Fig. 3, when fully inserted within the conduit still provides a restricted orifice of more or less of a funnel characteristic.

The slide plate 22 is the same type as that shown at 15 in Fig. 1 and the end 20 is identical, but the reverse end 23 does not have the mating characteristic of end 21. The particular configuration of the slide plate 15 is shown in Fig. 8 in diagrammatic form. The straight sided slot 19 can vary in angularity with respect to the axis of the valve anywhere from just above 0° to 90°, but it is to be noted that where the slide plate approaches perpendicularity in entering the valve, the cross-sectional configuration of the plate will approach that of a flat plate, and in the same manner where the angularity approaches parallelism with the axis of the conduit the cross section will approach that of the circle of the conduit of the exterior of the slot. For intermediate angular dispositions the cross section of the plate will be more or less elliptical and can be arrived at and designed as shown in the discussion of the layout shown in Fig. 7 to follow.

Fig. 7 is a drawing showing the development of the cross section and end of a slide plate which is used for complete closure of the conduit. This slide plate indicated at 24 has an end 21, similar to the end 21 of slide plate 15 in Fig. 1, and which closes completely against the side of the conduit along one complete interior half of the conduit, whereas closure at the other one-half is effected by the entry and passage of the plate through the slot 19 which covers half the circumference of the conduit indicated at 25 for purposes of example. In this drawing showing the development of the end 21, 7A shows the end of the conduit, 7B is a plan view showing the entry of the slide plate through the conduit and closed completely within the interior of the conduit, 7C is an end view of the slide plate 24, and 7D is a plan view of the slide plate 24.

In this development for the slide plate 24 which enters the conduit 25 at an angle of 45°, a number of equidistantly spaced points are struck off through a peripheral distance corresponding to the length of the slot in the upper half of the conduit 25. Where the slot is equal to one-half the periphery of the conduit as shown in Fig. 7, this distance is for the entire upper half of the conduit. These are indicated at 31, 32, 33, 34, 35, 36, 37, 38, 39, 40 and 41. These points are struck off as mentioned above at equidistant points on a periphery of the upper half of the conduit 25 and are then dropped down to Fig. 7B parallel with the sides of the conduit to intersect with the slide plate 24. At the intersection of these lines with the edge 26 of end 21 a series of parallel lines perpendicular to the 45° axis of entry indicated by the straight back edge 27 of the slide plate 24 are drawn. It is to be noted that edge 26 will be straight as viewed in Fig. 7B for all angles of entry of the slide plate because of the geometrical requirements effected by the use of the straight slot 19. The intersections from the dropped lines are indicated by prime numbers from the respective points, thus 37′ indicates the intersection of the dropped point 37. The intersection of the aforementioned perpendicular lines which are drawn from the dropped line intersections are indicated on the axis of the side plate shown in Fig. 7D at double prime designations. Thus 37″ indicates the carrying out and execution of this line.

Then the edge of the side plate is located by marking off on the line 37′—37″ away from the axis a length equal to the distance between the point 37 in Fig. 7A and the horizontal axis of the conduit 25. Similarly, the other points corresponding to points 38, 39, 40 and 41 are also located to determine the edge configuration of the end 21.

The cross section configuration of the side plate 24 shown in Fig. 7C is determined in a similar manner. Thus, the point 35 in Fig. 7A is dropped down to the strike or line of entry shown in Fig. 7B and the intersection 35′ is then carried parallel to the axis of entry to the intersection of the axis in Fig. 7C at 35″. Then the point 35‴ is located on the edge by marking off a length equal to the distance from point 35 in Fig. 7A to the horizontal axis of the conduit 25. Similarly, point 32 and the other points indicated are also likewise dropped down to determine the crosswise configuration.

Fig. 8, showing the different views of the slide plate 15 for the 100% free opening and previously described, were similarly developed in the manner above described. Thus, in that figure, Fig. 8A is a plan view of the entry of the slide plate 15 into the conduit 13 and in a position to provide for 100% free opening, Fig. 8B is an end view of the slide plate 15, and Fig. 8C is a plan view of the slide plate.

This procedure can be used for the development of the proper end configuration and the cross section of the slide plate where the line of entry is the straight slot above described for any position of entry or angular disposition of the slide plate within the valve so that a wide latitude of positional relationship may be had and used, depending upon the ultimate design desired.

*In use*

The slide valve of this invention is of particular advantage in pressure or flow regulating systems comprising a number of different conduits feeding in a system where a closely controlled regulation is required to be obtained. Thus, in one line it may be desired that the pressure drop be increased, and consequent flow decreased, to provide for a proper balancing of the whole system at any desired point. This can be done by the slide valve of this invention and still allow the requisite flow and without the creation of turbulence by the proper regulation of the slide plate to accomplish the desired pressure drop by regulating the restriction within the conduit. Alternately, if 100% free flow is desired, it can be easily obtained by withdrawing the slide valve to within the slot 19 of the valve housing.

When the slide valve is in the position shown in Fig. 1, partial restriction and a partial pressure drop within the conduit is obtained without the creation of undue turbulence. Thus, as shown in Fig. 3, a more or less circular orifice is obtained, and because of the funnel-like configuration of the angularly disposed slide plate taken together with the side walls of the conduit 11, there is a gradual throttling down effect without the creation of undue turbulence. If a flat plate were to have been used this funnel-like effect would not be obtained and also, as mentioned before, the line of intersection of the slide plate with the housing would not be at right angles to the axis of the housing and add to the length of the valve.

The slide plate 15 can be easily adjusted by the proper setting of the setscrew 16 between 100% free opening and full insertion of the slide plate wherein, as mentioned previously, about 80% restriction is established. The sealing effect is also of great value since in dust laden atmospheres, as is quite often encountered in mill practice, seepage within the valve can take place with the use of a normal slide valve. Because of the sealing relationship established for the valve of the present invention, this hazard has been obviated.

Where it is desired to establish a greater restriction than 80% with the valve shown in Fig. 1, the slide plate 15 may be removed so that the end 21 is inserted first whereby full mating relationship with the side walls of the conduit 12 at the end of the plate can be obtained. In this modification approximately 90% or so restriction can be established, which is less than 100% because the plate is narrower than the diameter of the conduit, as shown in Fig. 3.

Where complete sealing of the conduit is to be desired, the valve slide plate of Fig. 7, that is the plate 24, is utilized which enters within one-half of the circumference and outer periphery of the slot so as to completely enclose the interior of the conduit. It will be noted, however, that where this slide plate is withdrawn partially for the regulation of fluid flow to some intermediate value between fully open and fully closed, the sides of the slide plate will not be in sealing contact with the side walls of the slot so that for intermediate throttling down or regulation the slide plate 15 should be used.

However, as an obvious modification, a valve can be utilized having a slot extending half-way around the periphery of the valve of the circular valve housing 16 which is extended to one-half of the circumference of the collar 13 and in which the slide plate 24 can be accommodated. When intermediate throttling or full opening is desired, a filler plate can be utilized to restrict this slot to the size of the opening shown in Fig. 1 so that the slide plate 15 can be accommodated, as will be readily understood to those skilled in the art.

Due to the adaptability of the design of this valve whereby varying angles of entry of the slide plate can be utilized, it will be apparent that other modifications can be made using the disclosure of this invention herein. Thus, this valve is of a special value because of the extreme short length with which it can be made, by virtue of the straight line slot configuration along the periphery of the collar at right angles to the axis, and makes possible a very practical and efficient valving arrangement. If desired, the collar can be adapted so as to receive varying sizes of pipe, and it is obvious that a wide latitude of connections may be had in this manner.

Various other modifications and changes in designs of this valve may be had utilizing the teachings of this invention, as will readily appear to those skilled in the art, and it is desired that such changes be included within the scope of this invention as defined by the claims appended hereto.

What is claimed is:

1. A valve for controlling fluid flow through a straight tubular member having a generally circular exterior surface, said valve including an adjustable slide plate movable obliquely through a valve slot, into and out of the tubular member, said slide plate having a curved cross section and having inner and outer surfaces intersecting with curved exterior surfaces of the tubular member in intersecting lines which lie in parallel planes positioned at right angles to the axis of the tubular member.

2. A valve for controlling fluid flow through a straight tubular member having a generally circular exterior surface, said valve including an adjustable slide plate movable obliquely through a valve slot, into and out of the tubular member, said slide plate having a curved cross section and having inner and outer surfaces intersecting with curved exterior surfaces of the tubular member in intersecting lines which lie in parallel planes positioned at right angles to the axis of the tubular member, said slide plate having a generally concave recess at the end inserted into the tubular member whereby the plate may be substantially withdrawn from the tubular member to allow free opening through the interior of the tubular member while maintaining the slot completely sealed.

3. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section whereby the slot through the housing is shortened in a direction axially of the housing, said slide plate further having a generally concave recess at the end inserted into the housing whereby the plate may be substantially withdrawn from the housing to allow free opening through the interior of the housing while maintaining the slot completely sealed.

4. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section whereby the slot through the housing is shortened in a direction axially of the housing, said slide plate further having a generally concave recess at the end inserted into the housing whereby the plate may be substantially withdrawn from the housing to allow free opening through the interior of the housing while maintaining the slot completely sealed, and said means for connecting the conduits including a socket at one end of the housing for receiving one conduit in female relationship and a nipple at the other end of the housing for receiving the opposed conduit in male relationship.

5. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section and having inner and outer surfaces intersecting the exterior opening surfaces of the housing in intersecting lines which lie in parallel planes positioned at substantially right angles to the axis of the opening.

6. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section and having inner and outer surfaces intersecting the exterior opening surfaces of the housing in intersecting lines which lie in parallel planes positioned at substantially right angles to the axis of the opening, and said means for connecting the conduits including a socket at one end of the housing for receiving one conduit in female relationship and a nipple at the other end of the housing for receiving the opposed conduit in male relationship.

7. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section whereby the housing is shortened in an axial direction, and said slide plate further having a generally concave recess at the end inserted into the housing whereby the plate may be substantially withdrawn from the housing to allow free opening through the interior of the housing while maintaining the slot completely sealed, said slide plate presenting a funnel-like restriction when inserted into said tubular member to establish a partial closure with a minimum of turbulence to fluid flow therethrough.

8. A valve coupling device comprising a housing having a generally cylindrical interior opening, a slide plate which is movable into and out of the housing obliquely through a slot in the housing, said housing having means at opposed ends for connecting conduits thereto, said slide plate having a curved cross section whereby the housing is shortened in an axial direction, said slide plate having two opposed ends, one of said ends having a concave recess and the other end when inserted within said tubular member being convexly shaped so as to bear in mating contact at said end against the interior wall of the housing, said slide plate being reversible within said slot so that either end may be inserted within the tubular member.

References Cited in the file of this patent

UNITED STATES PATENTS

| | | |
|---|---|---|
| Re. 13,366 | Bowers | Feb. 6, 1912 |
| 880,581 | Seagrave | Mar. 3, 1908 |
| 1,028,376 | Miller | June 4, 1912 |
| 1,569,503 | Kurtz | Jan. 12, 1926 |
| 2,026,948 | Leibing | Jan. 7, 1936 |